(12) United States Patent
Valdegrama et al.

(10) Patent No.: US 8,597,770 B2
(45) Date of Patent: Dec. 3, 2013

(54) COMPOSITE MATERIAL PART WITH STRINGER ON RAMP

(75) Inventors: Vicente Martínez Valdegrama, Madrid (ES); José Orencio Granado Macarrilla, Madrid (ES); Manuel Recio Melero, Madrid (ES); Antonio Blázquez Ajenjo, Madrid (ES)

(73) Assignee: Airbus Operations S.L., Madrid (ES)

( * ) Notice: Subject to any disclaimer, the term of this patent is extended or adjusted under 35 U.S.C. 154(b) by 351 days.

(21) Appl. No.: 12/981,635

(22) Filed: Dec. 30, 2010

(65) Prior Publication Data
US 2011/0159244 A1 Jun. 30, 2011

(30) Foreign Application Priority Data

Dec. 31, 2009 (ES) .................................. 200931314

(51) Int. Cl.
*B32B 3/00* (2006.01)
*B64C 1/00* (2006.01)
*B64C 3/00* (2006.01)

(52) U.S. Cl.
USPC .................. 428/172; 244/119; 244/123.1

(58) Field of Classification Search
USPC ............... 428/156, 172; 244/119, 123.1, 126
See application file for complete search history.

(56) References Cited

U.S. PATENT DOCUMENTS 6,372,072 B1 4/2002 Healey
2005/0211846 A1* 9/2005 Leon-Dufour et al. ....... 244/126

FOREIGN PATENT DOCUMENTS

EP 1 840 775 A1 10/2007

* cited by examiner

*Primary Examiner* — Donald J Loney
(74) *Attorney, Agent, or Firm* — Birch, Stewart, Kolasch & Birch, LLP

(57) ABSTRACT

Composite material part (11) with stringer (31) on ramp, manufactured from a stack of fabrics, which comprises at least one zone (13) with two sectors (17, 19) having a greater thickness than that of the surrounding zones and with the stringer (31) situated on an edge (21) of said zone (13) in which: a) each group of fabrics (27, 27' . . . ; 29, 29', . . . ) of said sectors (17, 19) has the dimensions to form on said edge (21) a ramp with an acceptable gradient 1/p so that the stringer (31) remains situated on the ramp; b) the stacking of the zone (13) is carried out firstly by placing the fabrics (27, 27', . . . ) of the first sector (17) and on these the fabrics (29, 29', . . . ) of the second sector (19) in such a way that in the coinciding section (35) of said edge (21) the gradient of the resulting ramp is 1/(p/2).

3 Claims, 2 Drawing Sheets

COMPOSITE MATERIAL PART WITH STRINGER ON RAMP

SCOPE OF THE INVENTION

This invention refers to a composite material part with an integrated reinforcement element which gives rise to a ramp due to the zones of differing thickness and, more particularly, to a skin of a torsion box of an aircraft wing with a reinforcement stringer situated on a ramp between zones of different thickness.

BACKGROUND TO THE INVENTION

Manufacturing processes for parts which basically comprise a first stage of fabric stacking are well known in the aeronautical industry through ATL "Automatic Tape Lay-Up" and a second stage of autoclave curing.

In the stacking stage layers of composite material such as pre-impregnated material which is a mixture of fibrous reinforcement and polymeric matrix suitable for storage, are placed in a mould/tool.

This material may take various forms and in particular that of fabric. For thermohardening matrices the resin is generally partially cured or through another process it is brought to a controlled viscosity known as B-stage.

The fabrics of composite material are not placed randomly but rather a number are arranged in each zone and with an orientation of their fibrous reinforcement, typically carbon fibre, determined on the basis of the nature and magnitude of the forces which the part will support in each zone. For this purpose, ATL machines are generally used (Automatic Tape Lay-up).

Automatic tape lay up machines are very effective for manufacturing flat or substantially flat laminates as admissible gradients for said machines are small.

Nevertheless, some aeronautical structures comprise ramps in which, despite the fact that from a design point of view it would be desirable to have gradients greater than those of which the ATL machines are capable, ultimately they are designed with lower gradients in order to adapt to the conditioning factors of these machines, leading to a number of disadvantages which this invention seeks to overcome.

SUMMARY OF THE INVENTION

One object of this invention is to provide a stacking structure of a part made from composite material, such as the skin of a torsion box of an aircraft wing, with a configuration which comprises a ramp between two zones of different thickness with dimensions which permit a reinforcement element such as a stringer to be situated on said ramp, optimising the weight of the part and permitting its manufacture using an ATL process.

Another object of this invention is to provide a stacking structure of a part made in composite material such as a skin of the torsion box of an aircraft wing, the configuration of which comprises a ramp between two zones of different thickness with dimensions which enable a reinforcement element such as a stringer, to be placed on it and thus facilitate its effective curing.

These and other objects are obtained by means of a part manufactured from a stack of fabrics of composite material, which comprises at least one zone with a first sector of greater thickness than that of the surrounding zones and a second sector interior to and thicker than the first sector, with a longitudinal reinforcement element situated on the edge of said zone in which:

a) each group of fabrics of said sectors has the dimensions for forming a ramp on said edge with a gradient with an acceptable predetermined 1/p value so that the foot of said longitudinal reinforcement element remains situated on the ramp.

b) the stacking of said sectors is made by firstly arranging the fabrics from the first sector and then placing the fabrics from the second sector on top so that in the coinciding section of said edge the gradient of the resulting ramp is 1/(p/2).

In a preferred embodiment, said predetermined gradient 1/p is less than or equal to 1 in 40. In this way it is possible to permit manufacturing of the part permitting the correct co-gluing of the longitudinal reinforcement element on a ramp which comprises gaps.

In another preferred embodiment said part is a skin of the torsion box of an aircraft wing and the zone with said sectors of greater thickness is a zone comprising a motor.

Other characteristics and advantages of the present invention will be indicated in the detailed description of an embodiment which illustrates the object with relation to the figures which accompany said description.

DETAILED DESCRIPTION OF THE INVENTION

This invention is applicable to parts made from composite material with zones having considerable differences in thickness and with reinforcement stringers some of which may be situated on transition ramps between those zones, which implies adjusted requirements when establishing the gradients of the transition ramps between zones of differing thickness.

These requirements, particularly those applicable to ramps in which stringers must be situated in order to permit their correct co-gluing, in cases in which the differences in thickness are very marked, require the ramps to be considerably extended with the concomitant impact in weight as occurs particularly in the case of the skins of the torsion boxes of aircraft wings which are parts having enormous differences in thickness.

Figure 1:
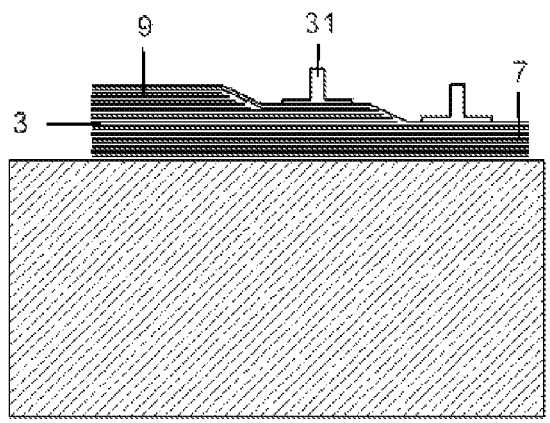
FIGS. 1 and 2 show cross section diagrams of a composite material part showing known solutions for situating stringers on ramp zones.

A conventional design shown in FIG. 1 is a part 3 in which the reinforcement stringer 31 is situated on a flat section between two ramps between zones of differing thickness 9, 7. Although in this case said ramps may have gradients in the order of 1 in 10, the design is not satisfactory due to the considerable weight of the part.

Figure 2:
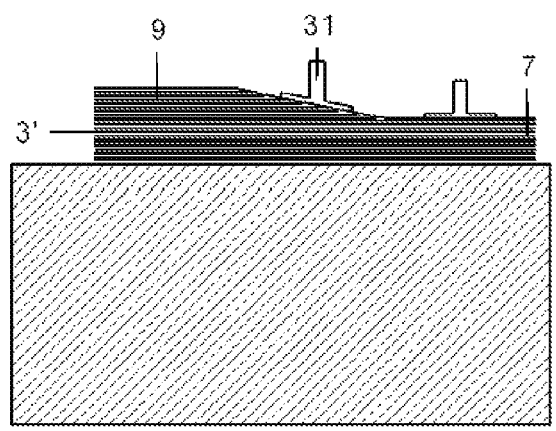

In order to reduce said weight, designs are known with the stringer 31 situated on a ramp between the zones of different thickness 9, 7 such as that shown in FIG. 2. With this design the ramp of the part 3' should have a gradient in the order of 1 in 40 required by the stringer curing process which means that the part continues to be considerably heavy in weight.

Figure 3:
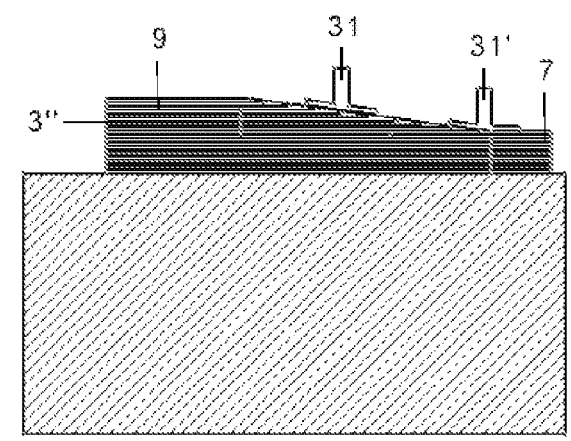
FIG. 3 shows a cross section diagram of a composite material part showing an unacceptable situation possibility of situating a stringer on a ramp zone.

In turn and as is shown in FIG. 3, if the difference in thickness between the zones 9,7 of the part 3" is very big, the ramp extends considerably and would require the following stringer 31 to be situated in the change of gradient between the inclined section of the ramp and the zone 7, which is an unacceptable location.

Designs are also known with two stringers arranged on an extended ramp which are not satisfactory because they increase the weight and the cost of the part and may present quality problems due to the difficulties of curing the part with two stringers situated on one ramp.

Designs are also known in which the ramp begins after the first stringer with only the second one remaining on the ramp, however this implies a considerably heavy weight of the part.

From the foregoing it may be deduced that it would be desirable to manufacture parts in composite material of the kind for coverings of torsion boxes of aircraft wings (that is large parts with considerable changes in thickness) which, in compliance with the requirement that the stringers should be situated on gradients equal to or lower than 1 in 40, the weight of the part can be reduced to a maximum.

Figure 4:
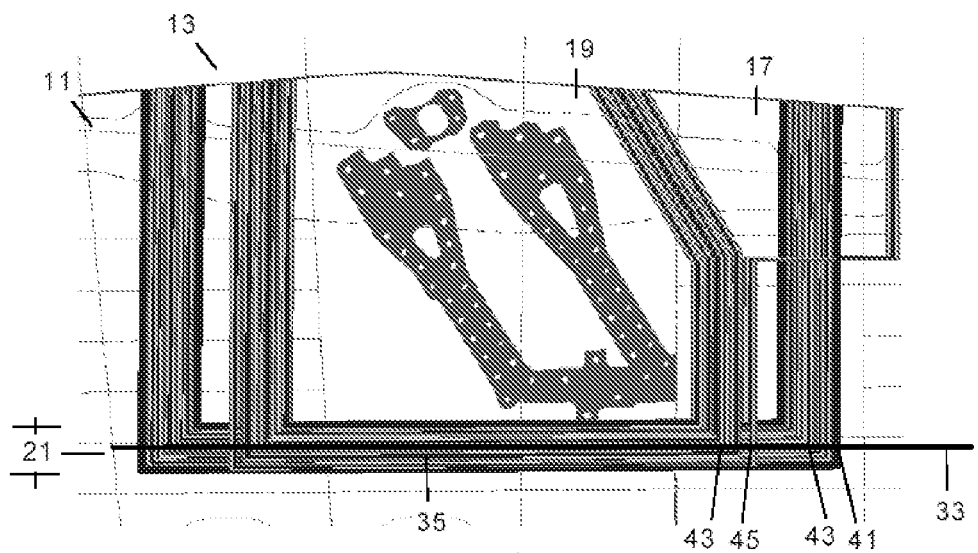
FIG. 4 shows a ground view of the stacking of a composite material part according to this invention.
Figure 5:
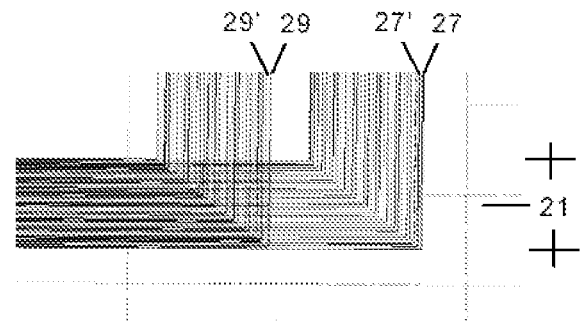
FIG. 5 shows a partial view in detail of the stacking of the thickest zone of the part referred to in this invention.
Figure 6:
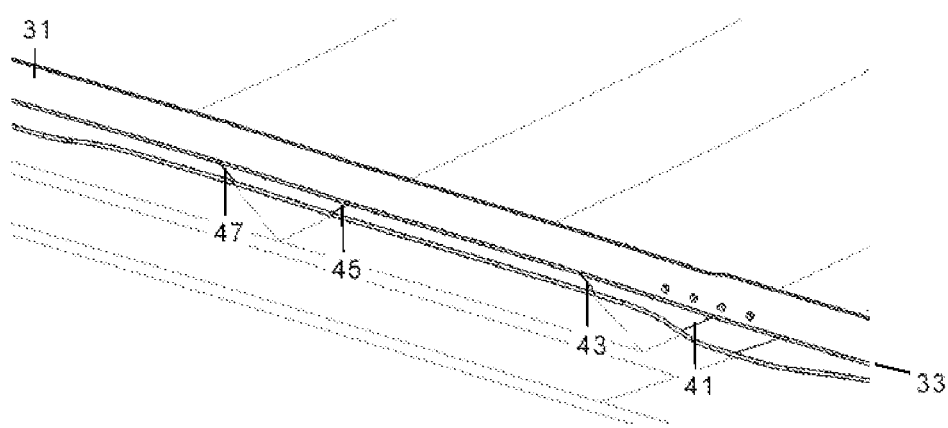
FIG. 6 is a perspective view of the stringer arranged on the edge of the ramp in said zone.

According to a preferred embodiment of this invention and as shown in FIGS. 4-6, the part 11 comprises a zone 13, with a first sector 17 with a greater thickness than that of the surrounding zones and a second sector 19 interior to and thicker than the first sector 17, with an edge 21 on which a stringer 31 should be situated following a course 33.

In order to ensure that on one hand, the stringer complies with the requirement of being situated on ramps with gradients less than or equal to 1 in 40, and which furthermore, minimizes the extension of the ramp between the zone 13 and the zone surrounding the part 11 on the edge 21, the groups of fabrics 27, 27'... 29, 29'... have dimensions corresponding to said sectors 17, 19 in order to form on said edge 21 ramps with a gradient of 1 in 40 acceptable in order to ensure that the foot of the reinforcement stringer 31 is situated on the ramp and the stacking is carried out (see FIG. 5) by firstly arranging the fabrics 27, 27'... of the first sector 17 and on these the fabrics 29, 29',... of the second sector 19 in such a way that in the coinciding section 35 the gradient of the resulting ramp is 1 in 20.

With this arrangement, and following the path of the stringer 31 on said edge 21 from right to left, FIGS. 4 and 6 show that having obtained the first fabric 27 of the first sector 17 (position 41, FIGS. 4 and 6) it is situated on the ramp with a gradient of 1 in 40 of that first sector 17 passing over the point of its corner (position 43, FIGS. 4 and 6) and is situated on that ramp until it reaches the first fabric 29 of the second sector 19 (position 45 FIGS. 4 and 6) and is situated on the ramp with a gradient of 1 in 40 of that second sector 19 passing through the corner point (position 47 FIGS. 4 and 6) following which it is situated on that ramp.

Therefore two gradients of 1 in 40 are conjugated in order to form a single gradient of 1 in 20 in the ramp of the section coinciding 35 with the first and second sector 17, 19 thus ensuring that the stringer 31 "sees" firstly a ramp with a gradient of 1 in 40 and once it has been situated thereon it again "sees" another ramp with a gradient of 1 in 40. In this way the stringer 31 passes through two ramps having a gradient of 1 in 40, which is what the aforementioned requirements permit, however finally it is situated on a ramp with a gradient of 1 in 20 which, as it is not extensive, permits optimisation of the part 11 in terms of weight.

In the preferred embodiments we have just described ramps with a gradient of 1 in 40 have been mentioned, considering that in the processes for connecting the stringers to currently used skins (eg co-gluing) that is, the maximum acceptable gradient for locating reinforcement stringers in ramps however, as an expert in the art would understand, the invention would be applicable to greater gradients if the requirements of those processes permitted.

In the preferred embodiments of the invention that we have just described those modifications comprised in the scope defined by the following claims may be introduced.

The invention claimed is:

1. A part manufactured from a stack of composite material fabrics which comprises at least one zone with a first sector of greater thickness than surrounding zones and a second sector disposed interior to and thicker than the first sector and a longitudinal reinforcement element situated on an edge of said zone, wherein,
  a) each stack of fabrics of said sectors has dimensions which form, on said edge, a ramp with a gradient having a predetermined value I/p of less than or equal to 1 to 40, so that a foot of said longitudinal reinforcing element is situated on the ramp;
  b) wherein the first and second sectors are stacked by first arranging the frames of the first sector, and then arranging on the fabrics of the first sector, the fabrics of the second sector such that the coinciding sector defines said edge in which the gradient of the resulting ramp is I/(p/2).

2. The part according to claim 1, wherein it forms a part of the skin of an aircraft wing.

3. A structure of composite material which comprises:
  fabric sectors of differing thicknesses and transition ramps disposed between these sectors of different thicknesses, and
  reinforcement stringers operatively associated with said structure of composite material, at least some of the reinforcement stringers being disposed on the transition ramps between said sectors of differing thickness,
  wherein the gradient of the transition ramps is equal to or less than 1 to 40, and
  wherein the fabric sectors are stacked such that in edges of coinciding sectors, the gradient of the resulting ramp is 1 to 20.

* * * * *